United States Patent
Yamaguchi

(10) Patent No.: US 7,983,184 B2
(45) Date of Patent: Jul. 19, 2011

(54) MOBILE COMMUNICATION DEVICE AND RECEPTION QUALITY INFORMATION CREATION METHOD

(75) Inventor: Keiko Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 284 days.

(21) Appl. No.: 12/298,173

(22) PCT Filed: Apr. 27, 2007

(86) PCT No.: PCT/JP2007/059195
§ 371 (c)(1),
(2), (4) Date: Oct. 23, 2008

(87) PCT Pub. No.: WO2007/126064
PCT Pub. Date: Nov. 8, 2007

(65) Prior Publication Data
US 2009/0154370 A1   Jun. 18, 2009

(30) Foreign Application Priority Data
Apr. 27, 2006   (JP) .................................. 2006-123472

(51) Int. Cl.
*H04J 3/14* (2006.01)
(52) U.S. Cl. ........................................ 370/252; 370/328
(58) Field of Classification Search .................... 370/252
See application file for complete search history.

(56) References Cited

U.S. PATENT DOCUMENTS

| | | | | |
|---|---|---|---|---|
| 7,286,619 B2 * | 10/2007 | Yano | ............................. | 375/347 |
| 7,363,057 B2 * | 4/2008 | Ishii et al. | .................. | 455/562.1 |
| 7,376,095 B2 * | 5/2008 | Bae et al. | ..................... | 370/320 |
| 7,403,745 B2 * | 7/2008 | Dominique et al. | ....... | 455/67.11 |
| 7,421,045 B2 * | 9/2008 | Pietraski | ....................... | 375/346 |
| 7,486,935 B2 * | 2/2009 | Akahori | .......................... | 455/68 |
| 7,599,666 B2 * | 10/2009 | Hamalainen et al. | ........... | 455/69 |
| 7,711,033 B2 * | 5/2010 | Reial et al. | .................... | 375/147 |
| 7,715,489 B2 * | 5/2010 | Zeng | ............................. | 375/267 |
| 7,778,312 B2 * | 8/2010 | Cairns et al. | .................. | 375/150 |
| 2003/0171118 A1 * | 9/2003 | Miya | ............................. | 455/442 |
| 2004/0066841 A1 * | 4/2004 | Jonsson | ........................ | 375/148 |
| 2005/0281358 A1 * | 12/2005 | Bottomley et al. | ........... | 375/343 |
| 2006/0057965 A1 * | 3/2006 | Braun et al. | ............... | 455/67.11 |
| 2007/0071145 A1 * | 3/2007 | Perets | ........................... | 375/346 |
| 2008/0101443 A1 * | 5/2008 | Lindoff et al. | ................. | 375/148 |

FOREIGN PATENT DOCUMENTS

| | | |
|---|---|---|
| EP | 1569492 A2 | 8/2005 |
| EP | 1612981 A2 | 1/2006 |
| EP | 1619923 A2 | 1/2006 |
| JP | 2005057710 A | 3/2005 |
| JP | 2005064963 A | 3/2005 |

OTHER PUBLICATIONS

International Search Report for PCT/JP2007/059195 mailed Jul. 31, 2007.

* cited by examiner

*Primary Examiner* — Ricky Ngo
*Assistant Examiner* — Ben H Liu

(57) ABSTRACT

When a processing delay detection unit (27) detects that an end timing (F) of measurement of the reception quality of a common pilot signal transmitted from a wireless base station has delayed from a creation start time limit for reception quality information, approximate reception quality information (k) is created on the basis of reception quality measured before the creation start time limit. The approximate reception quality information is transmitted to a wireless base station. The delay of the transmission timing of the reception quality information can be prevented, and the wireless base station can quickly set the transmission rate of transmission data to a cellular phone.

15 Claims, 6 Drawing Sheets

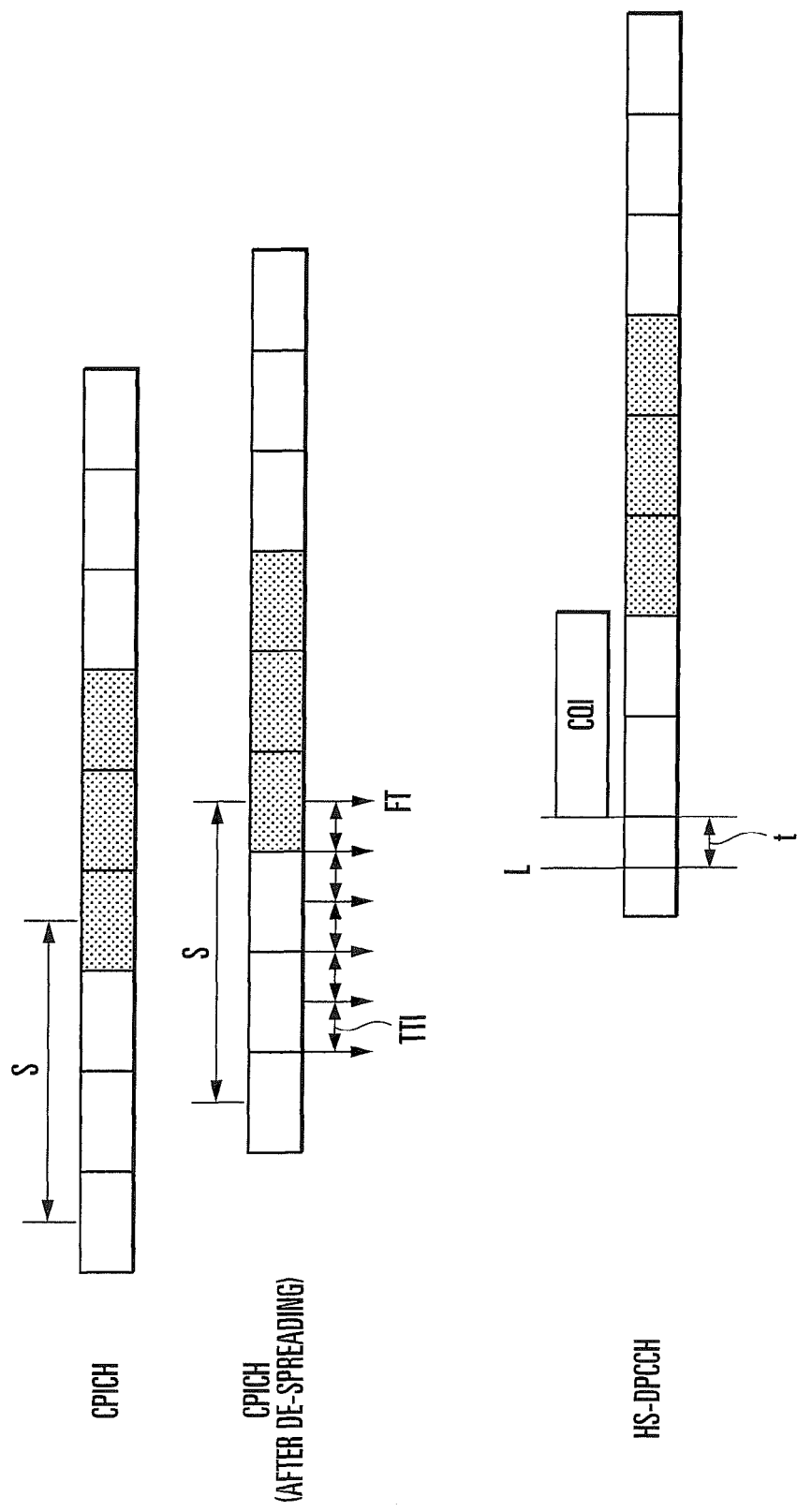

… (US 7,983,184 B2)

MOBILE COMMUNICATION DEVICE AND RECEPTION QUALITY INFORMATION CREATION METHOD

TECHNICAL FIELD

The present invention relates to a mobile communication device and a reception quality information creation method and, more particularly, to a mobile communication device suitably applied to a cellular phone conforming to 3GPP (3rd Generation Partnership Project) standards to be compatible with the specifications of third generation mobile communication systems, and a reception quality information creation method used for the mobile communication device.

BACKGROUND ART

3GPP (3rd Generation Partnership Project), which is a standardization project for W-CDMA (Wide-band Code Division Multiple Access) wireless communication systems, has promoted standardization of HSDPA (High Speed Downlink Packet Access) schemes which are packet transmission schemes designed to increase the transmission rates of downlinks from wireless base stations to mobile communication devices such as cellular phones. This HSDPA scheme uses an HS-PDSCH (High Speed-Physical Downlink Shared Channel) and an HS-SCCH (High Speed-Shared Control Channel of HS-PDSCH) as downlink physical channels. An HS-PDSCH is used to transmit packet data and shared by a plurality of mobile communication devices. An HS-SCCH is used to transmit information associated with H-ARQ (Hybrid-Automatic Repeat Request which is an encoding scheme based on a combination of an error correction technique and an automatic retransmission request technique) control and the layer 1 information (the physical channel of the OSI protocol) of an HS-PDSCH such as TFRI (Transport-Format and Resource Related Information).

An HS-DPCCH (High Speed-Dedicated Physical Control Channel) is an uplink physical channel defined in the HSDPA scheme. This HS-DPCCH is used to transmit response information for the above H-ARQ and a CQI (Channel Quality Indicator: reception quality information). In this case, reception quality information is obtained by measuring the quality of a CPICH (Common Pilot Channel) signal. This reception quality information represents the communication state of a propagation path between a mobile communication device and a wireless base station, and is used to determine the encoding rate of data to be transmitted to a mobile communication device via an HS-PDSCH. In addition, quality is represented by Ec/Io (energy per chip/interference power per unit frequency).

Conventionally, as shown in FIG. 6, a cellular telephone conforming to this HSDPA scheme comprises an antenna 1, a duplexer (DUP) 2, a reception unit 3, a demodulation unit 4, a de-spreading unit 5, a reception power calculation unit 6, a buffer 7, an SIR calculation unit 8, a CQI selection unit 9, a multiplexer (MUX) 10, modulation units 11 and 12, a multiplexer (MUX) 13, and a transmission unit 14.

In this cellular phone, the reception unit 3 receives a reception radio wave Wa via the antenna 1 and the duplexer 2, and the reception result is separated into an HS-PDSCH (High Speed-Physical Downlink Shared Channel)/DPCH (Dedicated Physical Channel) including user information, an HS-SCCH (High Speed-Shared Control Channel)/CPICH (Common Pilot Channel) including control information, and the like. The demodulation unit 4 demodulates the HS-PDSCH, HS-SCCH, and DPCH into reception packet data, control information, and the like and outputs them.

Of the control information, CPICH information is used for the measurement/calculation of the power of a downlink signal from a wireless base station, and is used for the creation of a CQI (reception quality information). In creating a CQI, first of all, the de-spreading unit 5 performs de-spreading processing for each symbol (e.g., eight bits) of a CPICH, and the reception power calculation unit 6 calculates ISCP/RSCP at a predetermined TTI (Transmission Time Interval) corresponding to the HSDPA scheme. The buffer 7 buffers (stores) the obtained ISCP/RSCP until ISCP/RSCP corresponding to a CQI creation reference section is stored. Thereafter, the SIR calculation unit 8 calculates an SIR (Signal to Interference Ratio) by using the ISCP/RSCP corresponding to the CQI creation reference section. The CQI selection unit 9 creates a CQI on the basis of the calculation result.

The multiplexer (MUX) 10 multiplexes the CQI with other control information. The modulation unit 11 performs spread spectrum modulation of the resultant information using a local spreading code. The multiplexer (MUX) 13 multiplexes the resultant information with user information, control information, and the like which are spread-spectrum-modulated by the modulation unit 12 using a local spreading code to obtain information on an HS-DPCCH as an uplink channel. The transmission unit 14 converts the multiplexed information into a transmission signal and transmits it as a transmission radio wave Wb from the antenna 1 via the duplexer 2.

In addition to the above cellular phone, other techniques of this type are disclosed in, for example, the following references.

The communication terminal device disclosed in reference 1 (Japanese Patent Laid-Open No. 2005-057710) creates reception quality information (a temporary CQI) representing different reception qualities depending on whether a measurement value (SNR) representing the reception quality measured from a reception signal is equal to or more than a threshold or less than the threshold. This device also creates the probability density distribution of reception quality information by using the created reception quality information, and also calculates a median which is reception quality information indicating the maximum value of the probability densities of the created probability density distribution. The device then corrects the reception quality information on the basis of the difference between the calculated median and the reception quality information, thereby determining reception quality information (a report CQI) to be reported to a base station apparatus.

The communication device having the communication quality control function disclosed in reference 2 (Japanese Patent Laid-Open No. 2005-064963) reports, to a base station, feedback information created on the basis of a measurement result on channel quality. This device counts the number of times data blocks transmitted with the transmission parameter determined by the base station are normally or abnormally received, while assigning a weight corresponding to a likelihood predicted from the difference between feedback information and the transmission parameter actually used for transmission, and updates a channel quality threshold corresponding to the feedback information in accordance with the count value. This can create feedback information transmitted with a transmission parameter suitable for actual transmission characteristics and perform adaptive encoding modulation which keeps high communication quality constant even if the propagation environment is not constant or previously reported feedback information differs from the transmission parameter actually transmitted from the base station.

DISCLOSURE OF INVENTION

Problem to be Solved by the Invention

In the conventional cellular phone shown in FIG. 6, when, for example, step-out tends to occur between the local spreading code assigned to the self-station and the reception spreading code for a reception signal due to a deterioration in reception environment, the time required for de-spreading processing for a CPICH by the de-spreading unit 5 may dynamically vary. This variation causes the following problems.

According to the 3GPP standards, as shown in, for example, FIG. 7, a reference section S of a CQI is one subframe comprising three slots of the slots (e.g., 15 slots) constituting each frame of a CPICH and HS-DPCCH. The first slot at the head of one subframe of an HS-DPCCH is assigned for the transmission of an acknowledgement signal, and the second and third slots are assigned for the transmission of a CQI. In addition, a CQI creation start time limit L is set in the first slot at the head, and the interval from the CQI creation start time limit L to the end of the first slot is set as a CQI creation required time t.

For a CPICH after de-spreading, the reception power calculation unit 6 calculates ISCP/RSCP at a TTI (Transmission Time Interval). Conventionally, in some cases, when the time required for de-spreading processing for a CPICH by the de-spreading unit 5 varies, an end timing FT of the calculation of ISCP/RSCP delays from the CQI creation start time limit L, and the creation of a CQI is not complete within the creation required time t. If the creation of a CQI is not complete within the required time t, the transmission timing of the CQI to the wireless base station delays, and the setting of the transmission rate of transmission data to the cellular phone belonging to the wireless base station delays.

The communication terminal device disclosed in reference 1 is designed to correct reception quality information on the basis of the probability density distribution of reception quality information, and differs from the arrangement of the present invention. That is, the above problem remains unchanged.

In addition, the communication device disclosed in reference 2 is designed to improve communication quality by updating a channel quality threshold corresponding to feedback information, and differs from the arrangement of the present invention. That is, the above problem remains unchanged.

The present invention has been made in consideration of the above situation, and has as its object to provide a mobile communication device which prevents the transmission timing of a CQI from delaying and a reception quality information creation method used for the mobile communication device.

Means of Solution to the Problem

In order to solve the above problems, a mobile communication device according to the present invention comprises reception quality information creation means for measuring reception quality of a downlink signal transmitted from a wireless base station via a downlink at a predetermined time interval in a predetermined section in each frame of the downlink signal and creating reception quality information representing reception quality of the downlink signal on the basis of measurement result, transmission means for transmitting the reception quality information created by the reception quality information creation means to the wireless base station via an uplink, and reception means for receiving transmission data at a transmission rate set by the wireless base station on the basis of the reception quality information, wherein the reception quality information creation means comprises processing delay detection means for determining whether an end timing of measurement of reception quality has delayed from a predetermined creation start time limit of reception quality information, and reception quality information output means for calculating approximate reception quality information on the basis of reception quality measured before the creation start time limit when the processing delay detection means determines that the end timing has delayed, and outputting calculated approximate reception quality information as the reception quality information.

In addition, a reception quality information creation method according to the present invention comprises the steps of measuring reception quality of a downlink signal transmitted from a wireless base station via a downlink at a predetermined time interval in a predetermined section in each frame of the downlink signal and creating reception quality information representing reception quality of the downlink signal on the basis of the measurement result, transmitting the created reception quality information to the wireless base station via an uplink, and receiving transmission data at a transmission rate set by the wireless base station on the basis of the reception quality information, wherein the creating step comprises the steps of determining whether an end timing of measurement of reception quality has delayed from a predetermined creation start time limit of reception quality information, and calculating approximate reception quality information on the basis of reception quality measured before the creation start time limit when it is determined that the end timing has delayed, and outputting calculated approximate reception quality information as the reception quality information.

EFFECTS OF THE INVENTION

According to the present invention, when it is detected that the end timing of measurement of the reception quality of a downlink signal transmitted from a wireless base station has delayed from the creation start time limit of reception quality information, approximate reception quality information is calculated on the basis of the reception quality measured before the creation start time limit, and the calculated approximate reception quality information is transmitted as reception quality information to the wireless base station. This can prevent the transmission timing of the reception quality information from delaying, and quickly set the transmission rate of transmission data to a mobile communication device belonging to the wireless base station.

BRIEF DESCRIPTION OF DRAWINGS

FIG. 7 is a view for explaining problems in the cellular phone in FIG. 6.

BEST MODE FOR CARRYING OUT THE INVENTION

There are provided a mobile communication device which creates approximate reception quality information on the basis of reception quality measured before a creation start time limit and transmits the information as a CQI (reception quality information) to a wireless base station when it is detected that the end timing of measurement of the reception quality of a pilot signal (CPICH) transmitted from the wireless base station has delayed from the creation start time limit of a CQI (reception quality information), and a reception quality information creation method used in the mobile communication device.

Figure 1:
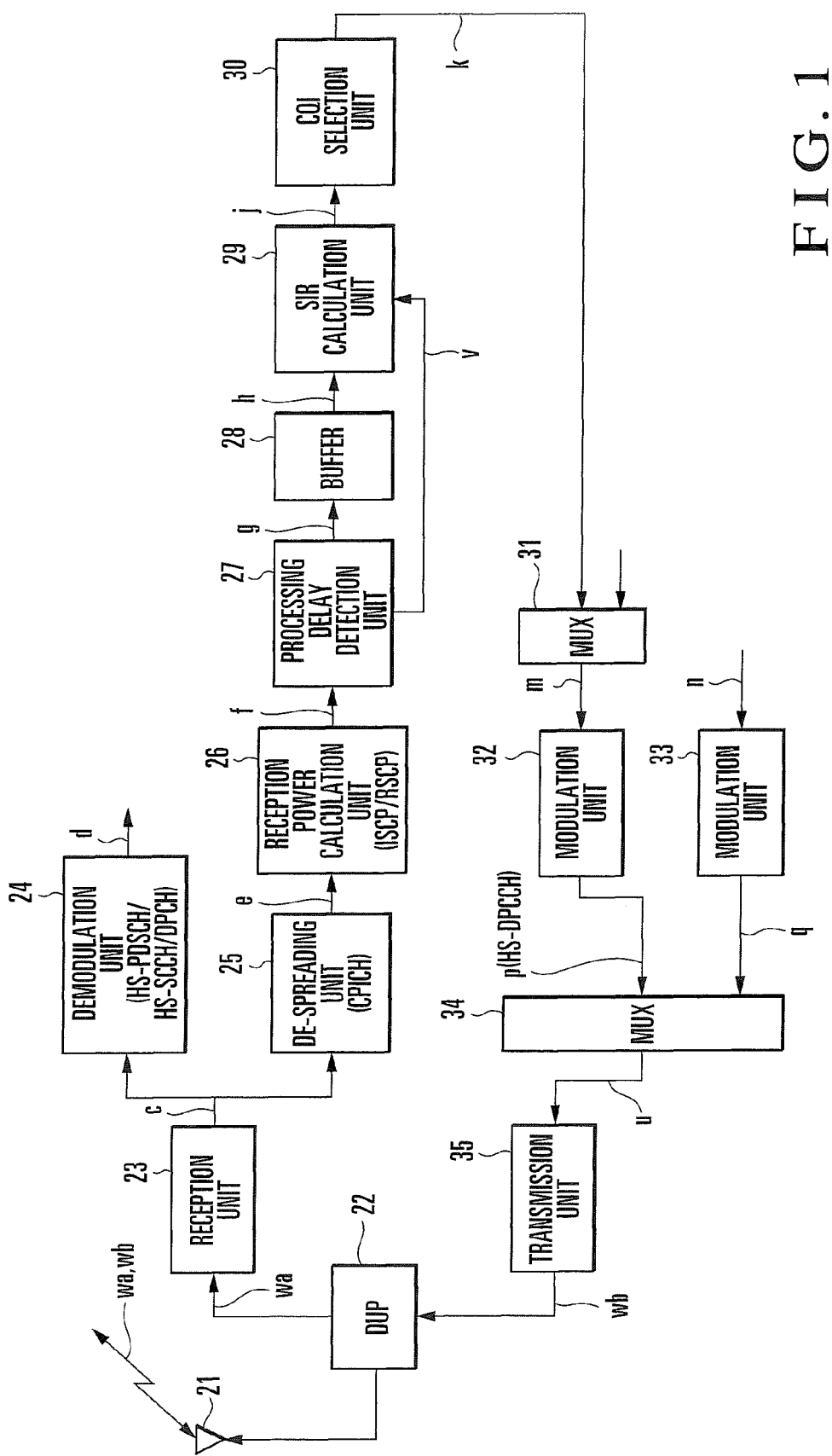
FIG. 1 is a block diagram showing the arrangement of the main part of a cellular phone as an exemplary embodiment of the present invention.
Figure 2:
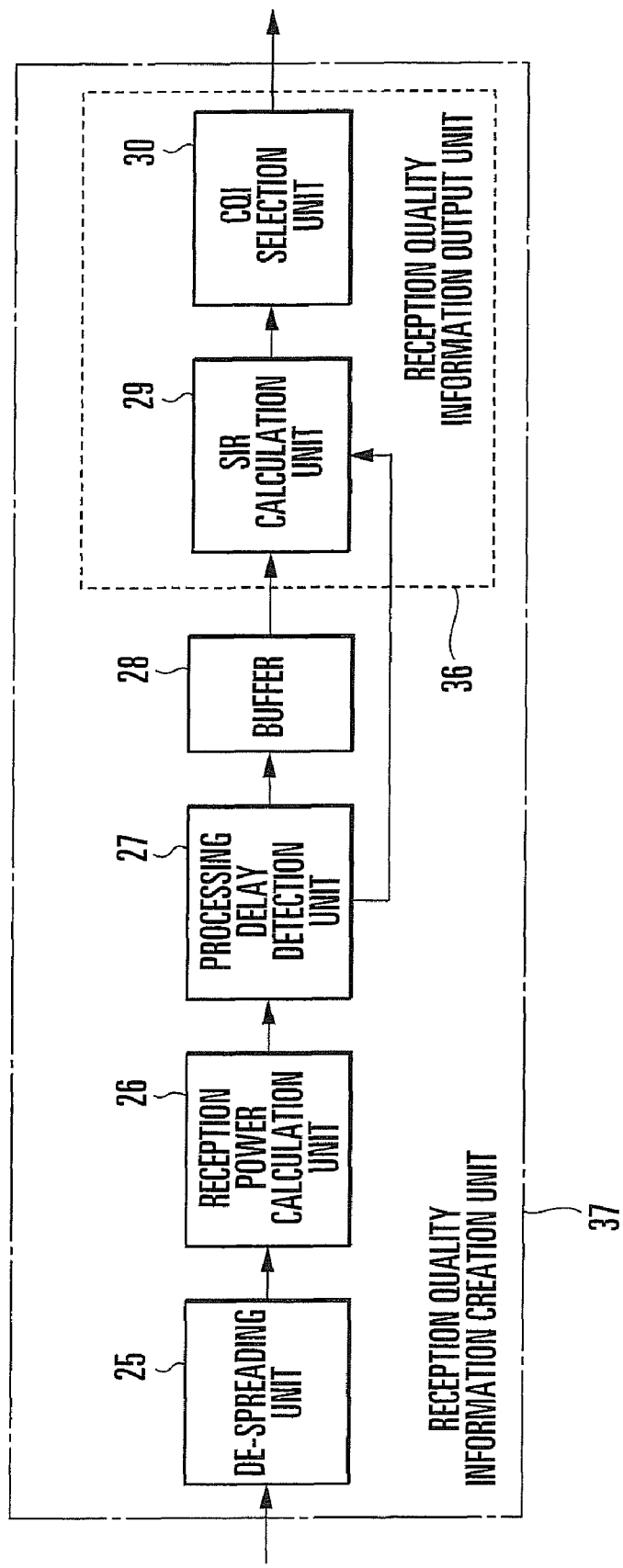
FIG. 2 is a block diagram showing the arrangement of a reception quality information creation unit.
Figure 3:
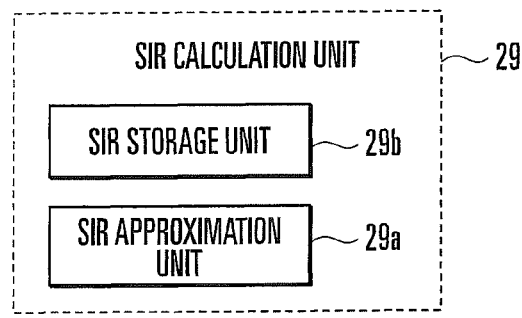
FIG. 3 is a block diagram showing the arrangement of an SIR calculation unit.

The arrangement of a mobile communication device as an exemplary embodiment of the present invention will be described with reference to FIGS. 1 to 3. The mobile communication device shown in FIG. 1 is a cellular phone and comprises an antenna 21, a duplexer (DUP) 22, a reception unit 23, a demodulation unit 24, a CPICH (Common Pilot Channel) de-spreading unit 25, a reception power calculation unit 26, a processing delay detection unit 27, a buffer 28, an SIR calculation unit 29, a CQI selection unit 30, a multiplexer (MUX) 31, modulation units 32 and 33, a multiplexer (MUX) 34, and a transmission unit 35. Note that as shown in FIG. 2, the SIR calculation unit 29 and the CQI selection unit 30 constitute a reception quality information output unit 36. The CPICH de-spreading unit 25, the reception power calculation unit 26, the processing delay detection unit 27, the buffer 28, and the above reception quality information output unit 36 constitute a reception quality information creation unit 37.

Referring to FIG. 1, the antenna 21 receives a reception radio wave Wa from a wireless base station (not shown) and transmits a transmission radio wave Wb. The wireless base station sets a downlink for this cellular phone, and is connected to a general telephone network via a mobile communication control station, visitor mobile-services switching center, and gateway mobile-services switching center (not shown).

The duplexer 22 separates the reception radio wave Wa and the transmission radio wave Wb to prevent interference between them. The reception unit 23 receives the reception radio wave Wa and outputs a reception signal c. The demodulation unit 24 generates reception packet data, control information d, and the like by demodulating an HS-PDSCH, HS-SCCH, and DPCH from the reception signal c output from the reception unit 23.

The CPICH de-spreading unit 25 extracts a CPICH from the reception signal c, and demodulates the CPICH by de-spreading a reception spreading code for each CPICH symbol (e.g., eight bits) by using the local spreading code assigned to the self-station in correspondence with code division multiple access. The CPICH de-spreading unit 25 then outputs a pilot signal e (downlink signal). The reception power calculation unit 26 performs the calculation of ISCP (Interference Signal Code Power)/RSCP (Received Signal Code Power: reception power of CPICH from wireless base station) for the pilot signal e at a predetermined TTI (Transmission Time Interval) corresponding to the HSDPA scheme, and outputs a reception power value f (reception quality). The reception power value f is represented by energy Ec/Io per chip corresponding to the interference power of the pilot signal e (downlink signal), demodulated by de-spreading, per unit frequency (energy per chip/interference power per unit frequency).

The processing delay detection unit 27 measures the reception power value f output from the reception power calculation unit 26 in a predetermined section (CQI reference section) S in each frame of the pilot signal e, and outputs the resultant value as a reception power value g to the buffer 28. This processing is sequentially performed every time the reception power value f calculated by the reception power calculation unit 26 at a TTI is input to the processing delay detection unit 27. The creation start time limit L for the creation of a CQI (reception quality information) representing the quality of a downlink by the CQI selection unit 30 on the basis of the measurement result on the reception power value f is set particularly in the processing delay detection unit 27. The processing delay detection unit 27 outputs a delay detection signal v to the SIR calculation unit 29 upon detecting that the end timing FT of measurement of the reception power value f has delayed from the creation start time limit L. The buffer 28 sequentially stores the reception power value g generated by the processing delay detection unit 27.

The SIR calculation unit 29 captures the reception power value g stored in the buffer 28 as a reception power value h, and calculates and outputs an SIR (Signal to Interference Ratio: signal power to interference power ratio) value j. In this exemplary embodiment, in particular, the SIR calculation unit 29 comprises an SIR storage unit 29a and SIR approximation unit 29b shown in FIG. 3. The SIR storage unit 29a stores SIR values j in a predetermined interval from the present to the past. When the processing delay detection unit 27 outputs the delay detection signal v, the SIR approximation unit 29b captures the reception power value g stored in the buffer 28 as the reception power value h and calculates an SIR value. The SIR approximation unit 29b then weights the SIR value in accordance with the length of the section in which the reception power value f has been measured before the creation start time limit L. Elements (1) and (2) described below are used for this weighting operation:

(1) the ratio between a section corresponding to ISCP/RSCP used for the calculation of an SIR value and a section (three slots) determined as the CQI reference section S; and (2) the predicted SIR value in the section which is calculated by regression analysis upon linearly interpolating the tendency of variations in CQI from samples of the past SIR values j by the least squares method.

The number of sample groups of past SIR values j used for the calculation of this predicted SIR value is determined by the standard deviation of time series in the past in a predetermined range relative to the neighborhood of the current processing section. The larger the calculated standard deviation, the wider the range from which sample points are collected. In addition, a Compressed Mode (a mode of performing measurement on cells with different frequencies) section and a CQI Repetition (repetition of CQI creation) section are excluded from the past sample groups of SIR values j used for weighting operation. If the variation tendency of the SIR values j exhibits some kind of periodicity, it may be better to handle such variation tendency as a waveform model by using Fourier transform than to linearly approximate it by using the least squares method. The calculation of the above standard deviation can be done before the calculation timing of an SIR value, and hence imposes no hindrance to the temporal restrictions on the start of CQI creation. Performing such weighting operation can maintain the relative relationship with the SIR value j generated in another reference section.

More specifically, the SIR approximation unit 29b integrates the ratio (1) described above to compensate for a shortage of section data with respect to the calculated SIR value, and obtains a predicted SIR value from the obtained value in accordance with (2) described above. The SIR approximation unit 29b sets the intermediate value between this predicted SIR value and the actually calculated SIR value as a final SIR value (approximate SIR value) j. This intermediate value is a value adjusted by weighting toward the predicted SIR value as the standard deviation which has already been calculated decreases.

The CQI selection unit 30 has a table in which the SIR values j output from the SIR calculation unit 29 are made to correspond to CQIs, and selects and outputs a CQIk corresponding to the SIR value j.

The multiplexer (MUX) 31 outputs a multiplexed signal m by multiplexing CQI information k output from the CQI selection unit 30 with other control information. The modulation unit 32 spread-spectrum-modulates the multiplexed signal m output from the multiplexer 31 by using a local spreading code, and outputs a modulated signal p for transmission on an HS-DPCCH (uplink quality control channel: uplink, uplink). The modulation unit 33 spread-spectrum-modulates user information, control information n, or the like by using a local spreading code, and outputs a modulated signal q for transmission on an HS-DPCCH. The multiplexer (MUX) 34 outputs a multiplexed signal u by multiplexing the modulated signal p with the modulated signal q. The transmission unit 35 converts the multiplexed signal u into a transmission radio wave Wb, and transmits it to a wireless base station from the antenna 21 via the duplexer 22.

The wireless base station sets the transmission rate (encoding rate) of the transmission data to this cellular phone on the basis of the transmitted CQIk.

The contents of processing by the reception quality information creation method used for the cellular phone shown in FIG. 1 will be described next with reference to FIGS. 4 and 5.

In this cellular phone, the creation start time limit L for the creation of the CQI (reception quality information) k by the CQI selection unit 30 is set in the processing delay detection unit 27. When the processing delay detection unit 27 detects that the end timing FT of measurement of the reception quality of a pilot signal (CPICH) transmitted from the wireless base station has delayed from the creation start time limit L, approximate reception quality information is created on the basis of the reception quality measured before the creation start time limit L, and is transmitted to the wireless base station. This approximate reception quality information is created by weighting and linearly interpolating the reception quality measured before the creation start time limit L so as to correspond to the length of the section in which the reception quality has been measured. The wireless base station sets the transmission rate (encoding rate) of the transmission data to this cellular phone on the basis of this approximate reception quality information. This operation will be described in detail below.

The reception radio wave Wa from the wireless base station is received by the antenna 21, and is input to the reception unit 23 via the duplexer 22. The reception unit 23 then outputs the reception signal c. The reception signal c is input to the demodulation unit 24 and is demodulated into an HS-PDSCH, HS-SCCH, and DPCH, thereby generating reception packet data, control information d, and the like.

Figure 4:
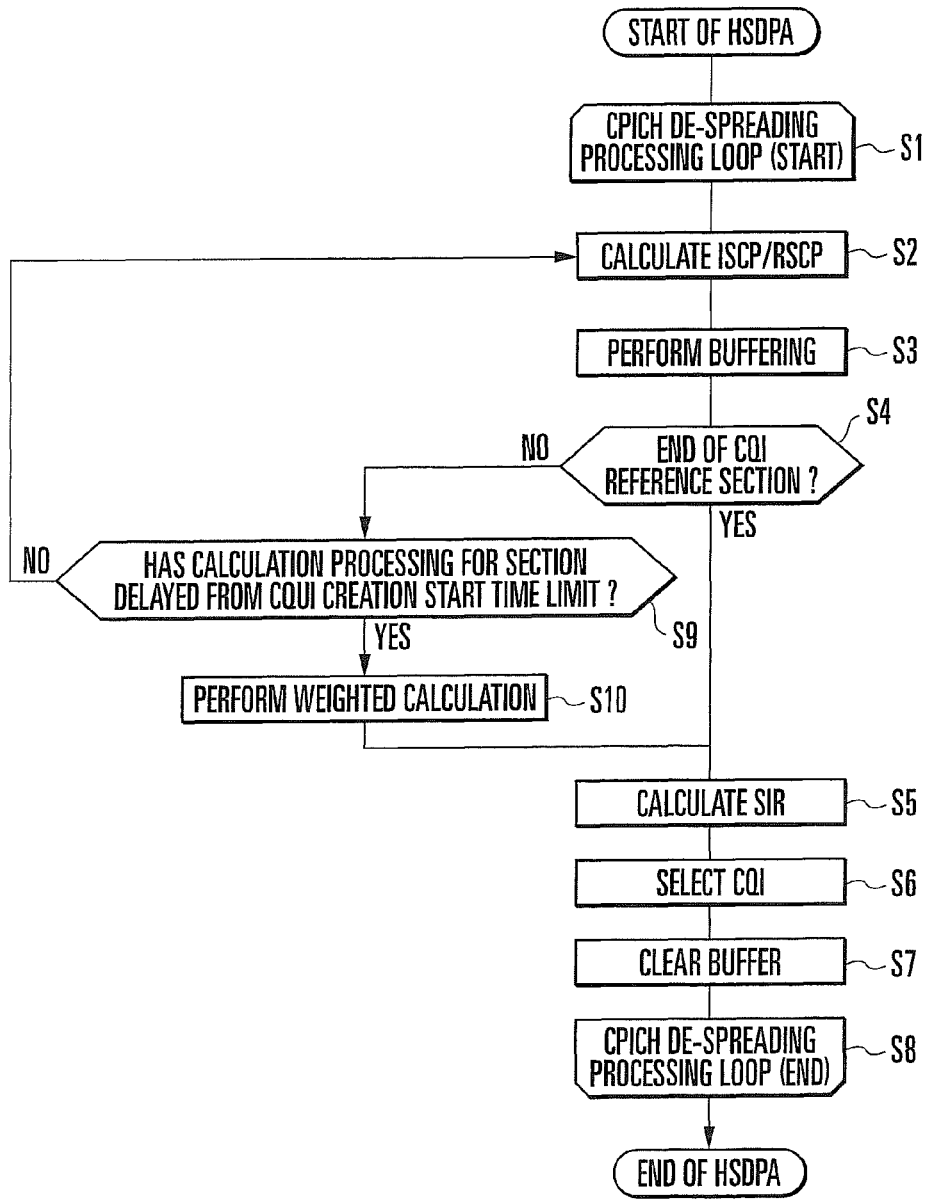
FIG. 4 is a flowchart for explaining the operation of the cellular phone shown in FIG. 1.
Figure 5:
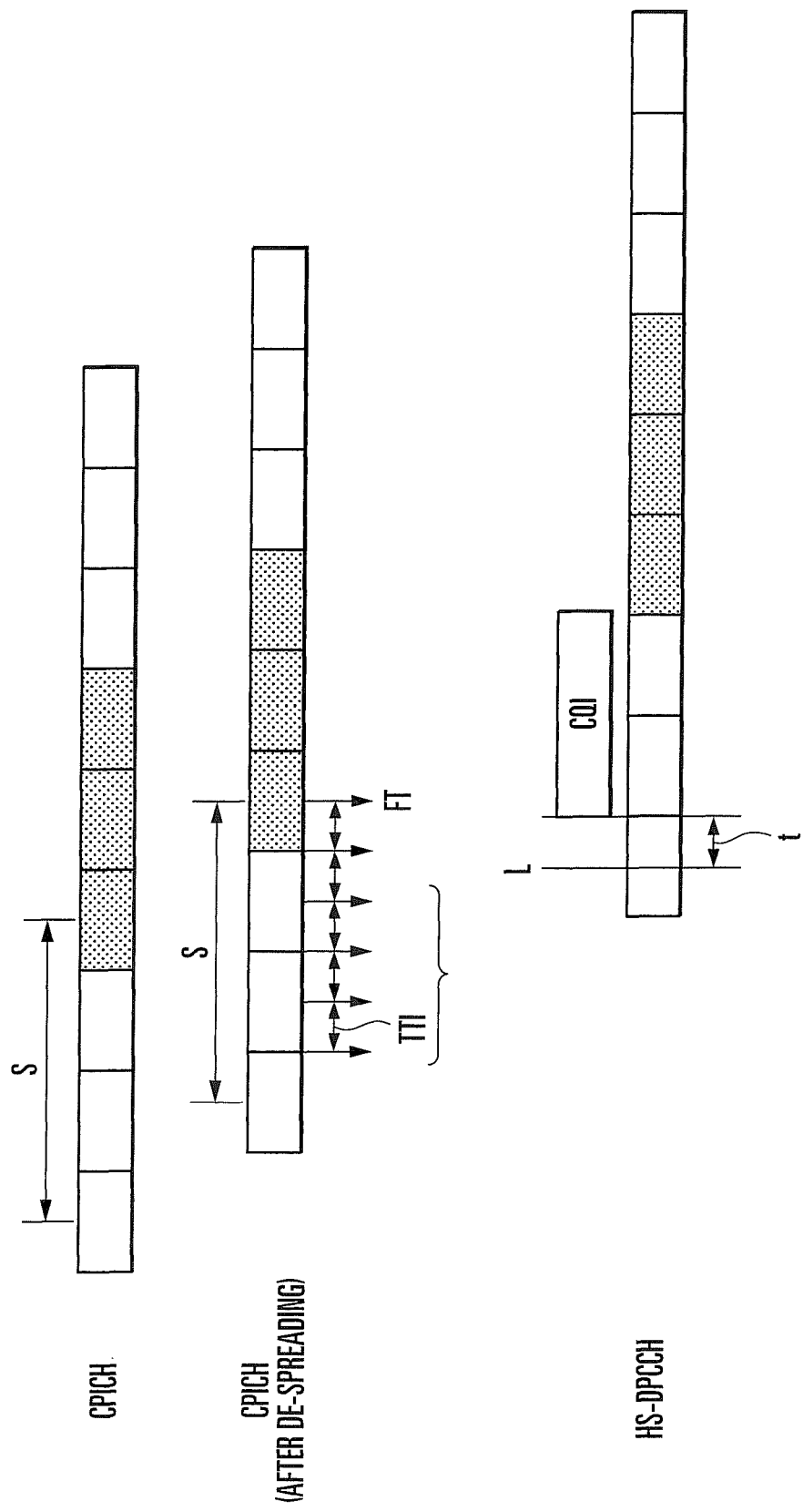
FIG. 5 is a timing chart for explaining the operation of the cellular phone shown in FIG. 1.
Figure 6:
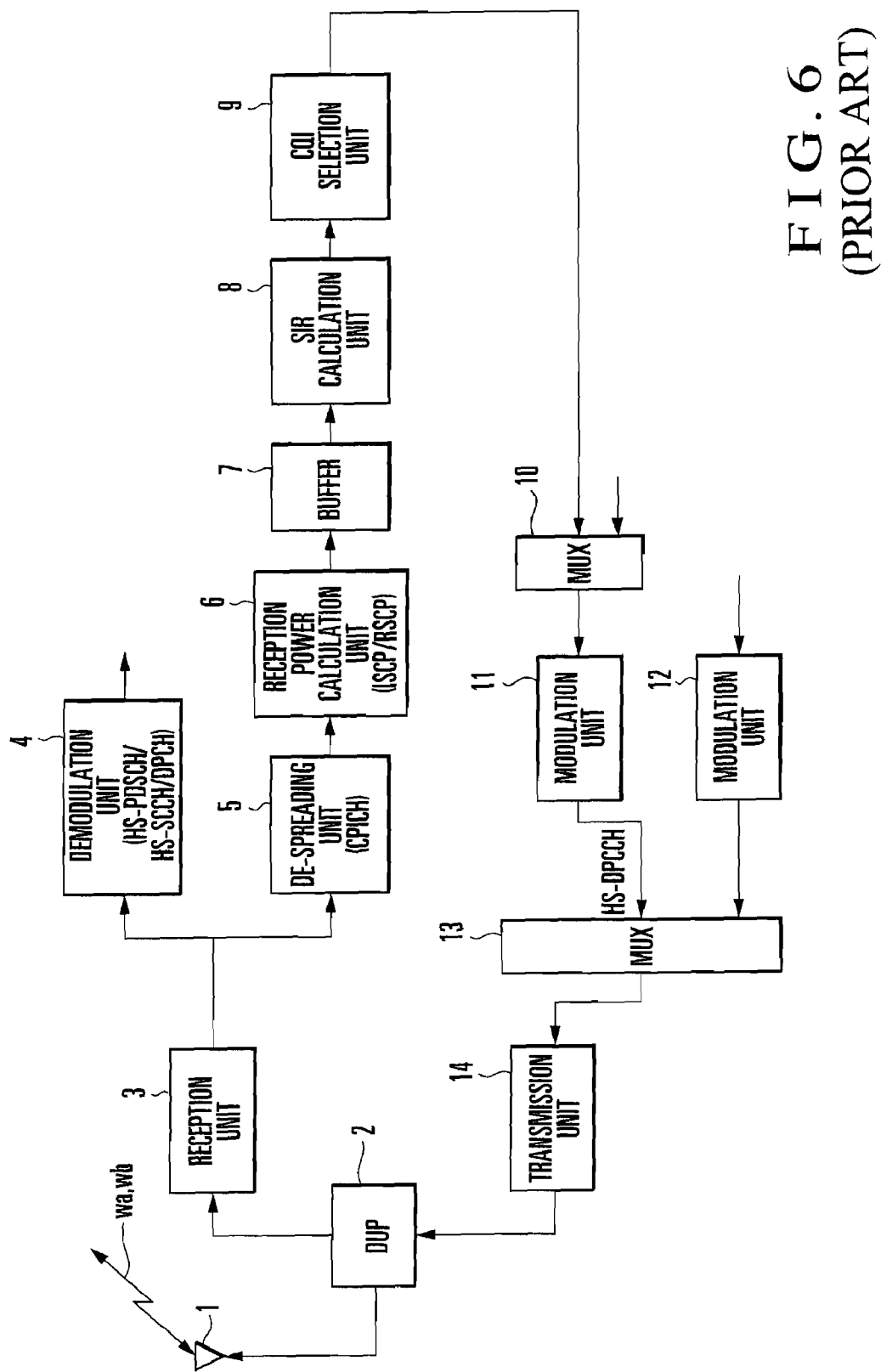
FIG. 6 is a block diagram showing the arrangement of a conventional cellular phone.

As shown in FIG. 4, the CPICH de-spreading unit 25 extracts a CPICH from the reception signal c from the start time of HSDPA, and de-spreads the reception spreading code of the CPICH for each symbol by using a local spreading code, thereby demodulating the pilot signal e (the start of a CPICH de-spreading processing loop in step S1). The reception power calculation unit 26 performs the calculation of ISCP/RSCP for the pilot signal e (step S2), and outputs a reception power value f (reception quality). The reception power value f is transmitted as the reception power value g via the processing delay detection unit 27 and stored in the buffer 28 (buffering in step S3).

If the currently processed data section is the end of the CQI reference section S (YES in step S4), the SIR calculation unit 29 captures, as the reception power value n, the reception power value g stored in the buffer 28 by this time point and calculates the SIR value j (step S5). The CQI selection unit 30 receives the SIR value j and selects and outputs the CQIk corresponding to the SIR value j (step S6). At this time, the buffer 28 is cleared (step S7). The CPICH de-spreading processing loop is terminated (step S8).

If the currently processed data section is not the end of the CQI reference section S (NO in step S4), the processing delay detection unit 27 determines whether the end timing FT of measurement of the reception power value f has delayed from the CQI creation start time limit L in the CQI selection unit 30 (step S9). If the unit determines that the timing has not delayed (NO in step S9), the process returns to step S2. Note that the calculation of ISCP/RSCP in step S2 is performed once every half slot (time width: 1TTI) of a CPICH (pilot signal e) after de-spreading, as shown in FIG. 5.

In contrast, if the processing delay detection unit 27 determines that the timing has delayed (YES in step S9), the unit outputs the delay detection signal v to the SIR calculation unit 29. In this case, the SIR calculation unit 29 captures, as the reception power value h, the reception power value g stored in the buffer 28 by this time and calculates an SIR value. The SIR calculation unit 29 then weights the SIR value in accordance with the length of the section in which the reception power value f has been measured before the creation start time limit L (weighted calculation in step S10) to calculate the final SIR value (approximate SIR value) j (step S5). Thereafter, the processing in steps S6 to S8 is performed. In this case, the CQI selection unit 30 selects an approximate CQI and outputs it as the CQIk.

The multiplexer 31 multiplexes the CQIk with other control information and outputs the multiplexed signal m. The modulation unit 32 spread-spectrum-modulates the multiplexed signal m by using a local spreading code and outputs the modulated signal p. The modulation unit 33 spread-spectrum-modulates user information, the control information n, and the like by using a local spreading code, and outputs the modulated signal q. The multiplexer 34 multiplexes the modulated signal p and the modulated signal q as information on HS-DPCCHs as uplink channels, and outputs the resultant signal as the multiplexed signal u. The transmission unit 35 converts the multiplexed signal u into the transmission radio wave Wb and transmits it from the antenna 21 to a wireless base station via the duplexer 22.

The wireless base station sets the transmission rate (encoding rate) of transmission data to this cellular phone on the basis of the transmitted CQIk.

As described above, in this exemplary embodiment, when the processing delay detection unit 27 detects that the end timing FT of measurement of the reception quality of a common pilot signal (CPICH) transmitted from a wireless base station has delayed from the creation start time limit L for the CQI (reception quality information) k, a reception quality information creation unit 37 creates approximate reception quality information on the basis of the reception quality measured before the creation start time limit L, and transmits the information to the wireless base station. This can prevent the transmission timing of reception quality information from delaying and quickly set the transmission rate of transmission data to a cellular phone belonging to the wireless base station.

In addition, the reception quality information creation unit 37 is configured to receive, as a downlink signal, a pilot signal transmitted from a wireless base station and measure its reception quality. The reception quality information creation unit 37 is also configured to de-spread the reception spreading code of a downlink signal by using the local spreading code assigned to the self-station in correspondence with code division multiple access and calculate, as reception quality, energy per chip corresponding to interference power per unit frequency of the downlink signal demodulated by the de-spreading.

The reception quality information creation unit 37 is also configured to create approximate reception quality information by weighting the reception quality of reception quality information which has been measured before the creation start time limit L so as to correspond to the length of the section in which the reception quality has been measured. This can improve the accuracy of the approximate reception quality information.

The reception quality information creation unit 37 is also configured to create approximate reception quality information by linearly interpolating reception quality measured before the creation start time limit L. This can improve the accuracy of the approximate reception quality information.

Although the exemplary embodiment of the present invention has been described in detail above with reference the accompanying drawings, the specific arrangement is not limited to this exemplary embodiment. The present invention incorporates even a case in which the design of the exemplary embodiment is changed within the scope of the present invention.

For example, in this exemplary embodiment, the mobile communication device is a cellular phone. However, the present invention can be applied to mobile communication terminals and the like in general, which transmit, to a wireless base station, reception quality information representing the quality of a downlink between itself and the wireless base station, such as a PDA (Personal Digital Assistants).

INDUSTRIAL APPLICABILITY

The present invention can be applied to mobile communication terminals based on the HSDPA scheme in general, and can be effectively used in a place where deterioration in wireless communication environment and the like occur between the terminal and a wireless base station.

The invention claimed is:

1. A mobile communication device comprising:
a reception quality information creation unit which measures reception quality of a downlink signal transmitted from a wireless base station via a downlink at a predetermined time interval in a predetermined section in each frame of the downlink signal and creating reception quality information representing reception quality of the downlink signal on the basis of the measurement result;
a transmission unit which transmits the reception quality information created by said reception quality information creation unit to the wireless base station via an uplink; and
a reception unit which receives transmission data at a transmission rate set by the wireless base station on the basis of the reception quality information,
said reception quality information creation unit comprising
a processing delay detection unit which determines whether an end timing of measurement of reception quality has delayed from a predetermined creation start time limit of reception quality information, and
a reception quality information output unit which calculates approximate reception quality information on the basis of reception quality measured before the creation start time limit when said processing delay detection unit determines that the end timing has delayed, and outputting calculated approximate reception quality information as the reception quality information.

2. A mobile communication device according to claim 1, wherein said reception quality information creation unit further comprises a reception quality measurement unit which measures reception quality of a pilot signal as a downlink signal transmitted from the wireless base station.

3. A mobile communication device according to claim 1, wherein said reception quality information creation unit further comprises
a de-spreading unit which de-spreads a reception spreading code of a downlink signal by using a local spreading code assigned to the mobile communication device in correspondence with code division multiple access, and
a reception quality measurement unit which calculates, as reception quality, energy per chip corresponding to interference power per unit frequency of a downlink signal demodulated by de-spreading.

4. A mobile communication device according to claim 1, wherein said reception quality information output unit calculates approximate reception quality information by weighting reception quality measured before the creation start time limit so as to correspond to a length of a section in which the reception quality has been measured.

5. A mobile communication device according to claim 1, wherein said reception quality information output unit calculates approximate reception quality information by linearly interpolating reception quality measured before the creation start time limit.

6. A mobile communication device according to claim 1, wherein
said reception quality information output unit comprises
a signal-power-to-interference-power-ratio calculation unit which calculates a signal power to interference power ratio from measured reception quality, and
a reception quality information selection unit which selects reception quality information corresponding to the signal power to interference power ratio obtained by said signal-power-to-interference-power-ratio calculation unit by referring to a table in which signal power to interference power ratios are made to correspond to reception quality information,
said signal-power-to-interference-power-ratio calculation unit comprises a signal-power-to-interference-power-ratio approximation unit which calculates a signal power to interference power ratio from reception quality measured before the creation start time limit when said processing delay detection unit determines that the end timing has delayed, and calculating an approximate signal power to interference power ratio by weighting the signal power to interference power ratio so as to correspond to a length of a section in which the reception quality has been measured, and
said reception quality information selection unit selects reception quality information corresponding to the approximate signal power to interference power ratio calculated by said signal-power-to-interference-power-ratio approximation unit.

7. A mobile communication device according to claim 6, wherein said signal-power-to-interference-power-ratio approximation unit integrates the ratio between a length of a section in which reception quality has been measured and the predetermined section with respect to a signal power to interference power ratio calculated from reception quality measured before the creation start time limit, obtains a predicted signal power to interference power ratio by linearly interpolating a tendency of variations in reception quality information with respect to the obtained value, and sets, as an approximate signal power to interference power ratio, a value between the predicted signal power to interference power ratio and a signal power to interference power ratio calculated from the reception quality measured before the creation start time limit.

8. A reception quality information creation method comprising the steps of:
measuring reception quality of a downlink signal transmitted from a wireless base station via a downlink at a predetermined time interval in a predetermined section in each frame of the downlink signal and creating reception quality information representing reception quality of the downlink signal on the basis of the measurement result;
transmitting the created reception quality information to the wireless base station via an uplink; and
receiving transmission data at a transmission rate set by the wireless base station on the basis of the reception quality information,
wherein the creating step comprises the steps of
determining whether an end timing of measurement of reception quality has delayed from a predetermined creation start time limit of reception quality information, and
calculating approximate reception quality information on the basis of reception quality measured before the creation start time limit when it is determined that the end timing has delayed, and outputting calculated approximate reception quality information as the reception quality information.

9. A reception quality information creation method according to claim 8, wherein the creating step further comprises the step of measuring reception quality of a pilot signal as a downlink signal transmitted from the wireless base station.

10. A reception quality information creation method according to claim 8, wherein the creating step further comprises the steps of
de-spreading a reception spreading code of a downlink signal by using a local spreading code assigned in correspondence with code division multiple access, and
calculating, as reception quality, energy per chip corresponding to interference power per unit frequency of a downlink signal demodulated by de-spreading.

11. A reception quality information creation method according to claim 8, wherein the outputting step comprises the step of calculating approximate reception quality information by weighting reception quality measured before the creation start time limit so as to correspond to a length of a section in which the reception quality has been measured.

12. A reception quality information creation method according to claim 8, wherein the outputting step comprises the step of calculating approximate reception quality information by linearly interpolating reception quality measured before the creation start time limit.

13. A reception quality information creation method according to claim 8, wherein
the outputting step comprises the steps of
calculating a signal power to interference power ratio from measured reception quality, and
selecting reception quality information corresponding to the signal power to a calculated interference power ratio by referring to a table in which signal power to interference power ratios are made to correspond to reception quality information,
the calculating step comprises the step of calculating a signal power to interference power ratio from reception quality measured before the creation start time limit when it is determined that the end timing has delayed, and calculating an approximate signal power to interference power ratio by weighting the signal power to interference power ratio so as to correspond to a length of a section in which the reception quality has been measured, and
the selecting step comprises the step of selecting reception quality information corresponding to the calculated approximate signal power to interference power ratio.

14. A reception quality information creation method according to claim 13, wherein the calculating step comprises the steps of
integrating the ratio between a length of a section in which reception quality has been measured and the predetermined section with respect to a signal power to interference power ratio calculated from reception quality measured before the creation start time limit,
obtaining a predicted signal power to interference power ratio by linearly interpolating a tendency of variations in reception quality information with respect to the value obtained by integration, and
setting, as an approximate signal power to interference power ratio, a value between the predicted signal power to interference power ratio and a signal power to interference power ratio calculated from the reception quality measured before the creation start time limit.

15. A mobile communication device comprising
reception quality information creation means for measuring reception quality of a downlink signal transmitted from a wireless base station via a downlink at a predetermined time interval in a predetermined section in each frame of the downlink signal and creating reception quality information representing reception quality of the downlink signal on the basis of the measurement result;
transmission means for transmitting the reception quality information created by said reception quality information creation means to the wireless base station via an uplink; and
reception means for receiving transmission data at a transmission rate set by the wireless base station on the basis of the reception quality information,
said reception quality information creation means comprising
processing delay detection means for determining whether an end timing of measurement of reception quality has delayed from a predetermined creation start time limit of reception quality information, and
reception quality information output means for calculating approximate reception quality information on the basis of reception quality measured before the creation start time limit when said processing delay detection means determines that the end timing has delayed, and outputting calculated approximate reception quality information as the reception quality information.

* * * * *